US009113305B2

(12) United States Patent
Lim et al.

(10) Patent No.: US 9,113,305 B2
(45) Date of Patent: Aug. 18, 2015

(54) METHOD AND APPARATUS FOR ESTIMATING LOCATION OF USER EQUIPMENT IN WIRELESS NETWORK

(71) Applicant: LG ELECTRONICS INC., Seoul (KR)

(72) Inventors: Dongguk Lim, Anyang-si (KR); Dongcheol Kim, Anyang-si (KR); Jiwoong Jang, Anyang-si (KR); Hangyu Cho, Anyang-si (KR); Jiwon Kang, Anyang-si (KR); Sungho Park, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 15 days.

(21) Appl. No.: 13/896,644

(22) Filed: May 17, 2013

(65) Prior Publication Data

US 2013/0310075 A1 Nov. 21, 2013

Related U.S. Application Data

(60) Provisional application No. 61/648,088, filed on May 17, 2012.

(30) Foreign Application Priority Data

May 16, 2013 (KR) .................. 10-2013-0055628

(51) Int. Cl.
*H04W 24/00* (2009.01)
*H04W 4/02* (2009.01)

(52) U.S. Cl.
CPC .................................... *H04W 4/025* (2013.01)

(58) Field of Classification Search
CPC ..... H04W 4/025; H04W 76/007; H04W 2/22; H04W 88/06; H04W 36/08
USPC .............. 455/404.2, 420, 422.1, 436, 456.1, 455/456.2, 550.1, 556.2; 370/328, 329, 370/331, 338
See application file for complete search history.

(56) References Cited

U.S. PATENT DOCUMENTS

| 8,624,725 | B1* | 1/2014 | MacGregor | 340/539.13 |
| 2010/0125409 | A1* | 5/2010 | Prehofer | 701/207 |
| 2013/0295967 | A1* | 11/2013 | Brisebois et al. | 455/456.3 |

* cited by examiner

*Primary Examiner* — Babar Sarwar
(74) *Attorney, Agent, or Firm* — Lee, Hong, Degerman, Kang & Waimey (57) ABSTRACT

A positioning method of estimating a location of a user equipment (UE) in a wireless network is disclosed. The positioning method includes performing positioning using a global positioning system (GPS)-based signal, checking whether the UE is located indoors based on received signal intensity of the GPS-based signal, and changing a positioning method using the GPS-based signal to a positioning method using a local area network (LAN)-based signal when it is determined that the UE is located indoors, and performing a positioning using the changed positioning method using the LAN-based signal.

10 Claims, 5 Drawing Sheets

METHOD AND APPARATUS FOR ESTIMATING LOCATION OF USER EQUIPMENT IN WIRELESS NETWORK

Pursuant to 35 U.S.C. §119, this application claims the benefit of earlier filing date and right of priority to Korean Application No. 10-2013-0055628, filed on May 16, 2013, and also claims the benefit of U.S. Provisional Application Ser. No. 61/648,088, filed on May 17, 2012, the contents of which are all hereby incorporated by reference herein in their entirety.

BACKGROUND OF THE INVENTION

1. Field of the Invention

The present invention relates to location estimation in wireless communication, and more particularly, to a method and apparatus for estimating a location of a user equipment (UE) in a wireless network.

2. Discussion of the Related Art

An assisted global positioning system (A-GPS) is a satellite-based positioning system that can under certain conditions (mostly, when a data link with a server is established) improve a GPS startup speed and reduce time to first fix (TTTF) (which is a time taken to fix a data link with an artificial satellite). An A-GPS is mainly used in a user equipment (UE) (e.g., a cellular phone or a smart phone) having a built-in GPS and was developed by Federal Communications Commission in order to transmit location information during 911 emergency calls.

A UE can support location information to a user via A-GPS technologies. A-GPS technologies are location information service technologies that are mainly used in 3rd generation partnership project (3GPP) standard and currently provide many services to subscribers. In simpler terms, the UE receives GPS (which corresponds to A-GNSS in terms of 3GPP) satellite information and transmits or receives location related information of a base station (BS) based on the GPS satellite information to receive accurate location information through a server that manages location information of the BS.

A-GPS technologies have been already used to provide more accurate location information using information received by a UE from a GPS via communication with a server that manages location information of a BS. Recently, A-GPS technologies have been mainly used in fields of wideband code division multiple access (WCDMA) of 3GPP standard or code division multiple access (CDMA) of 3GPP2 standard. In areas where UEs cannot easily receive location information, locations are estimated using satellite information alone, which is disadvantageously less accurate than A-GPS technologies. In addition, time required to acquire location information may be changed according to an area.

From the Cold War with the Soviet Union, the United States launched many artificial satellites out of the earth in order to spy upon the Soviet Union. These satellites periodically transmit location information to the earth at a specific frequency. When a UE receives location information to estimate a location, errors corresponding to several hundred meters may be experienced. Accordingly, for more accurate estimation and error reduction, a UE accesses a location information server of a BS using information received from a GPS to obtain a more accurate location, which is called A-GPS technologies. In general, an error range is reduced within several meters even if accuracy is changed according to a location of a UE within an area managed by a BS.

However, according to these technologies, problems arise in terms of location acquisition when a UE fails to receive GPS signals. Of course, when the UE is located in a building, the UE can receive GPS signals through antennas installed outdoors. However, currently, this reception is significantly limited, and thus, many problems arise in areas where GPS signals cannot be received, such as indoors or underground. In this case, it is very difficult to acquire accurate location information by the UE in reality. In this regard, detailed solutions to these problems have not yet been to be proposed.

SUMMARY OF THE INVENTION

Accordingly, the present invention is directed to a method and apparatus for estimating a location of a user equipment (UE) in a wireless network that substantially obviates one or more problems due to limitations and disadvantages of the related art.

An object of the present invention is to provide a method of estimating a location of a UE in a wireless network.

Another object of the present invention is to provide an apparatus for estimating a location of a UE in a wireless network.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a positioning method of estimating a location of a user equipment (UE) in a wireless network includes performing positioning using a global positioning system (GPS)-based signal, checking whether the UE is located indoors based on received signal intensity of the GPS-based signal, and changing a positioning method using the GPS-based signal to a positioning method using a local area network (LAN)-based signal when it is determined that the UE is located indoors, and performing a positioning using the changed positioning method using the LAN-based signal. The performing of the positioning using the LAN-based signal may further include setting a reference point for the performing of the positioning method using the LAN-based signal, storing the set reference point as an initial location and then measuring acceleration and angular velocity according to movement of the UE based on the reference point, and calculating a current location of the UE based on the reference point and the measured acceleration and angular velocity. The calculating of the current location of the UE may further include first filtering for determining whether the measured acceleration is valid data, if it is determined that the measured acceleration is valid data, second filtering for identifying a movement type of the UE by filtering the valid data, and calculating a length according to the movement type of the UE and calculating a movement distance of the UE in consideration of the calculated length and measurement time information, wherein the current location of the UE is calculated in consideration of the calculated movement distance (a first distance) of the UE, a movement distance (a second distance) calculated by performing dual integration on the measured acceleration, and a movement direction calculated from the measured angular velocity. The positioning method according to claim 3, wherein a weight factor obtained in consideration of the first and second distances is applied to calculate the current location of the UE. A value obtained by multiplying weight factors obtained in consideration of reliability to the first distance and the second distance and the current location of the UE is calculated by determining as a final movement distance of the UE from the reference point to calculate the current location of the UE. The reference point may be determined based on the GPS-based signal or received by the UE from an access point (AP) of the LAN. The positioning method may further include updating the reference point by changing the reference point to a point indicating the calculated current location of the UE. The positioning method may further include receiving location information from the AP, and calculating a current location of the UE to be updated by applying weight factors based on the reliability in consideration of reliability of the received location information.

In another aspect of the present invention, a user equipment (UE) for estimating a location in a wireless network includes a location information module, and a processor, wherein the processor configured to cause: the location information module checks whether the UE is located indoors based on received signal intensity of a global positioning system (GPS)-based signal while performing positioning using the GPS-based signal, and changes a positioning method using the GPS-based signal to a positioning method using a local area network (LAN)-based signal when it is determined when the UE is located indoors, and performing a positioning using the changed positioning method using the LAN-based signal.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the exemplary embodiments of the present invention with reference to the accompanying drawings. The detailed description, which will be given below with reference to the accompanying drawings, is intended to explain exemplary embodiments of the present invention, rather than to show the only embodiments that can be implemented according to the invention.

The following detailed description includes specific details in order to provide a thorough understanding of the present invention. However, it will be apparent to those skilled in the art that the present invention may be practiced without such specific details. For example, the following description focuses upon a case in which a mobile communication system is a 3rd generation partnership project (3GPP) long term evolution (LTE) system or a LTE-advanced (LTE-A) system. However, the present technical features, aside from unique features of 3GPP LTE and LTE-A can be applied to any other mobile system.

In some instances, well-known structures and devices are omitted in order to avoid obscuring the concepts of the present invention and important functions of the structures and devices are shown in block diagram form. The same reference numbers will be used throughout the drawings to refer to the same or like parts.

In addition, in the following description, it is assumed that a user equipment (UE) refers to any mobile or fixed type device of a user side, such as a user equipment, a mobile station (MS), an advanced mobile station (AMS), etc., and that a base station (BS) refers to any node of a network side that communicates with the UE, such as a Node B, an eNode B, a base station, AP (Access Point), etc. Throughout this specification, the technical features of the present invention are described based on an institute of electrical and electronic engineers (IEEE) 802.16 system, but can be applied to various other communication systems.

In a mobile communication system, a UE may receive information from a BS in downlink and transmit information in uplink. The information transmitted or received by the UE may be data and various control information. In addition, there are various physical channels according to the type or use of the information transmitted or received by the UE.

The following technical features can be applied to a variety of wireless access technologies, for example, code division multiple access (CDMA), frequency division multiple access (FDMA), time division multiple access (TDMA), orthogonal frequency division multiple access (OFDMA), single carrier frequency division multiple access (SC-FDMA), and the like. CDMA may be embodied through radio technology such as universal terrestrial radio access (UTRA) or CDMA2000. TDMA may be embodied through radio technology such as global system for mobile communication (GSM)/general packet radio service (GPRS)/enhanced data rates for GSM evolution (EDGE), etc. OFDMA may be embodied through radio technology such as IEEE 802.11 (Wi-Fi), IEEE 802.16 (WiMAX), IEEE 802-20, evolved UTRA (E-UTRA), and the like. UTRA is a part of a universal mobile telecommunications system (UMTS). 3GPP LTE is a part of evolved UMTS (E-UMTS), which uses E-UTRA. The 3GPP LTE employs OFDMA in downlink and employs SC-FDMA in uplink. LTE advanced (LTE-A) is an evolved version of 3GPP LTE.

Specific terms used in the embodiments of the present invention are provided to aid in the understanding of the present invention. These specific terms may be replaced with other terms within the scope and spirit of the present invention.

Figure 1:
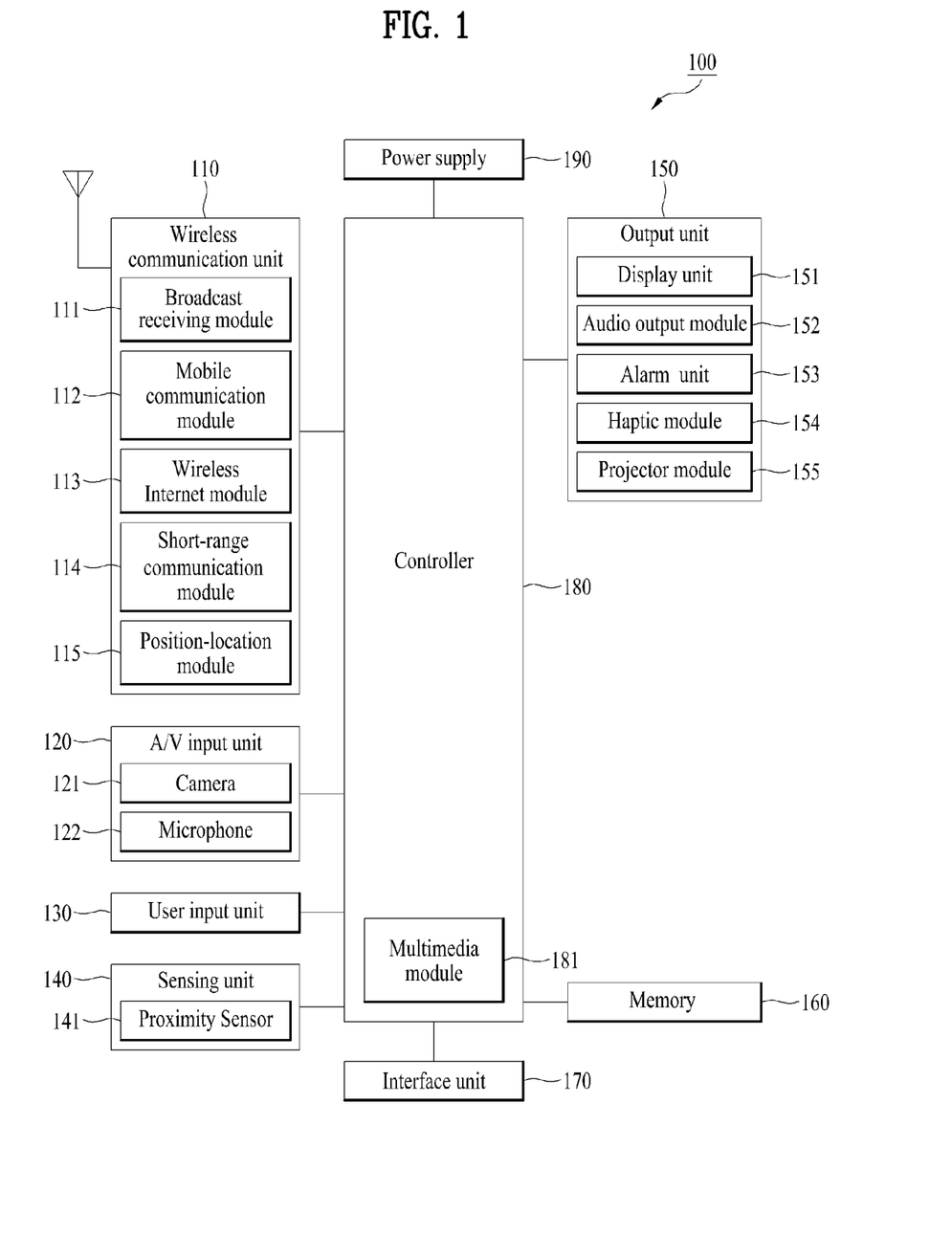
FIG. 1 is a schematic block diagram of a structure of a user equipment (UE) according to the present invention.

FIG. 1 is a schematic block diagram of a structure of a UE 100 according to the present invention.

Throughout this specification, a UE is not limited to a cellular phone as a telephone illustrated in the FIG. 1 and can be broadly applied to a smart phone, a notebook computer, a digital broadcast terminal, a personal digital assistant (PDA), a portable multimedia player (PMP) a navigation device, and the like. Thus, it can be understood that the UE includes any portable electronic product. The UE 100 may include a wireless communication unit 110, an audio/video (A/V) input unit 120, a user input unit 130, a sensing unit 140, an output unit 150, a memory 160, an interface unit 170, a controller 180, a power supply unit 190, etc. When these components are embodied in actual applications, two or more components are combined to constitute one component or one component is divided into two or more components, as necessary.

Hereinafter, these components will be sequentially described.

The UE 100 may include the wireless communication unit 110, the A/V input unit 120, the user input unit 130, the sensing unit 140, the output unit 150, the memory 160, the interface unit 170, the controller 180, the power supply unit 190, etc. The components illustrated in FIG. 1 are not required. Thus, greater or fewer components than in FIG. 1 may constitute the UE 100.

Hereinafter, these components will be sequentially described.

The wireless communication unit 110 may include one or more modules that can allow wireless communication between the UE 100 and a wireless communication system or between the UE 100 and a network in which the UE 100 is located. For example, the wireless communication unit 110 may include a broadcast receiving module 111, a mobile communication module 112, a wireless Internet module 113, a short range communication module 114, a location information module 115, etc.

The broadcast receiving module 111 receives a broadcast signal and/or broadcast related information from an external broadcast management server through a broadcast channel. The broadcast channel may include a satellite channel and a terrestrial channel. The broadcast management server may refer to a server that generates and transmits a broadcast signal and/or broadcast related information or a server that receives a pre-generated broadcast signal and/or broadcast related information and transmits the pre-generated broadcast signal and/or broadcast related information to a UE. The broadcast signal may include a broadcast signal formed by adding a data broadcast signal to a television (TV) broadcast signal or a radio broadcast signal as well as a TV broadcast signal, a radio broadcast signal, and a data broadcast signal.

The broadcast related information may refer to information regarding a broadcast channel, a broadcast program, or a broadcast service provider. The broadcast related information may be provided through a mobile communication network. In this case, the broadcast related information may be received by the mobile communication module 112.

A variety of types of broadcast related information may be present. For example, the broadcast related information may be present in the form of electronic program guide (EPG) of digital multimedia broadcasting (DMB), electronic service guide (ESG) of digital video broadcast-handheld (DVB-H), or the like.

The broadcast receiving module 111 may receive a digital broadcast signal using a digital broadcast system, for example, digital multimedia broadcasting-terrestrial (DMB-T), digital multimedia broadcasting-satellite (DMB-S), media forward link only (MediaFLO), digital video broadcast-handheld (DVB-H), DVB-CBMS, OMA-BCAST, integrated services digital broadcast-terrestrial (ISDB-T), etc. Of course, the broadcast receiving module 111 may be adapted to other broadcast systems as well as the aforementioned digital broadcast system.

The broadcast signal and/or broadcast related information received by the broadcast receiving module 111 may be stored in the memory 160.

The mobile communication module 112 transmits and receives a wireless signal to and from at least one of a BS, an external UE, and a server on a mobile communication network. The wireless signal may include a voice call signal, a video telephony call signal, and/or data in various forms according to transmission and reception of text/multimedia messages. The wireless Internet module 113 may refer to a module for wireless Internet access and may be installed internally or externally on the UE 100. As a wireless Internet technology, wireless LAN (WLAN) (Wi-Fi), wireless broadband (Wibro), world interoperability for microwave access (Wimax), high speed downlink packet access (HSDPA), etc. may be used.

The short range communication module 114 refers to a module for short range communication. As short range communication technologies, Bluetooth, radio frequency identification (RFID), infrared data association (IrDA), ultra wideband (UWB), ZigBee, etc. may be used.

The location information module 115 is a module for acquisition of location information of a UE. A representative example of the location information module 115 may include a global positioning system (GPS) module and an inertial sensor. According to current technologies, the GPS module may calculate information regarding distances from three or more modules and accurate time information and apply trigonometry to the calculated information to accurately calculate current location information according to latitude, longitude, and altitude. Currently, a method of calculating location and time information using three satellites and calibrating errors of the calculated position and time information using another satellite has been extensively used. In addition, the GPS module may continuously calculate a current location in real time to calculate velocity information. The inertial sensor calculates a relative location value by measuring a movement distance at a reference point using an accelerometer and by measuring a movement direction using a gyroscope. The inertial sensor will be described in more detail.

Referring to FIG. 1, the A/V input unit 120 is used to input an audio signal or a video signal and may include a camera 121 and a microphone 122. The camera 121 processes image frames of still images or moving pictures obtained by an image sensor in a video telephony mode or a photograph mode. The processed image frames may be displayed by a display unit 151. The image frames processed by the camera 121 may be stored in the memory 160 or externally transmitted through the wireless communication unit 110. The UE 100 may include two or more cameras 122 according to service environment.

The microphone 122 receives an external audio signal in a call mode, a recording mode, a voice recognition mode, or the like and processes the received audio signal into electrical voice data. In the call mode, the processed voice data is converted into a form in which the data can be transmitted to a mobile communication BS through the mobile communication module 112 and output. The microphone 122 may employ various noise removal algorithms for removal of noise generated when the external audio signal is received.

The user input unit 130 generates input data for control of an operation of the UE 100 from a user. The user input unit 130 may receive a signal indicating two or more content items among displayed content items, according to the present invention. In addition, the signal indicating the two or more content items may be received through touch input or hard and soft key input. The user input unit 130 may receive input for selection of one or two or more content items from the user. In addition, the user input unit 130 may receive input for generation of an icon related to a function performed by the UE 100. The user input unit 130 may include a direction key, a key pad, a dome switch, a touch pad (constant voltage/ capacitance), a jog wheel, a jog switch, and so on.

The sensing unit 140 may sense a current state of the UE 100 such as an open/close state of the UE 100, a location of the UE 100, whether a user touches the UE 100, a direction of the UE 100, and acceleration/deceleration of the UE 100 to generate a sensing signal for control of the operation of the UE 100. For example, when the UE 100 is a slide phone, the sensing unit 140 may sense whether the slide phone is opened or closed. In addition, the sensing unit 140 may sense whether the power supply unit 190 supplies power and whether the interface unit 170 is connected to an external device. The sensing unit 140 may include a proximity sensor 141. The proximity sensor 141 will be described below with regard to a touchscreen.

The output unit 150 may generate visual, auditory, or tactile output and may include the display unit 151, an audio output module 152, an alarm unit 153, a haptic module 154, and a projector module 155. The display unit 151 may display (output) information processed by the UE 100. For example, when the UE 100 is in a call mode, the display unit 151 displays a user interface (UI) or a graphical user interface (GUI) related to a telephone call. When the UE 100 is in a video telephony mode or a photograph mode, the display unit 151 displays a captured and/or received image, a UI, or a GUI. The display unit 151 may include at least one of a liquid crystal display (LCD), a thin film transistor-liquid crystal display (TFT LCD), an organic light-emitting diode (OLED), a flexible display, and a three-dimensional (3D) display. Among these, some displays may be a transparent type or a light transmission type display such that a user can view an object behind the display therethrough. In this case, these displays may be called a transparent display. A representative example of the transparent display may include a transparent OLED (TOLED) and the like. The display unit 151 may be configured to have a rear structure or a light transmission structure. Due to these structures, the user can view an object located behind a body of the UE 100 through a transparent area of the body of the UE 100, which is occupied by the display unit 151. The UE 100 may include two or more display units 151 according to an embodiment type of the UE 100. For example, the UE 100 may include a plurality of display units that are arranged or integrated on one surface at a predetermined distance or arranged on different surfaces. When the display unit 151 and a sensor (hereinafter, referred to as a 'touch sensor') for detection of a touch operation form a layered structure (hereinafter, referred to as a 'touchscreen'), the display unit 151 may be used as an input device as well as an output device. For example, the touch sensor may be in the form of a touch film, a touch sheet, a touch pad, and so on.

The touch sensor may convert variation in pressure applied to a specific portion of the display unit 151 or variation in capacitance generated at a specific portion of the display unit 151 into an electrical input signal. The touch sensor may sense pressure of touch as well as a location and area of the touch. When touch input to the touch sensor is present, a signal (signals) corresponding to the touch input is transmitted to a touch controller (not shown). The touch controller processes the signal (signals) and then transmits data corresponding to the processed signal to the controller 180. Thus, the controller 180 may recognize a touched portion of the display unit 151.

The proximity sensor 141 may be disposed in an internal region of the UE 100, surrounded by the touchscreen, or near the touchscreen. The proximity sensor 141 refers to a sensor that senses an object approaching a predetermined sensing surface or an object located near the proximity sensor 141 using an electromagnetic force or infrared rays without having mechanical contact. The proximity sensor 141 may have a longer lifetime than a contact sensor, thus having a wider range of applications. An example of the proximity sensor 141 may include a transmission type photoelectric sensor, a direct reflection type photoelectric sensor, a mirror reflection type photoelectric sensor, a high-frequency oscillating proximity sensor, a capacitive proximity sensor, a magnetic proximity sensor, an infrared proximity sensor, etc. When the touchscreen is of a capacitance type, the proximity sensor 141 may be configured to detect proximity of a pointer through variation in an electric field according to proximity of the pointer. In this case, the touchscreen (or a touch sensor) may be classified as a proximity sensor. Hereinafter, for convenience of description, an action of allowing recognition of presence of the pointer on the touchscreen via the pointer approaching the touchscreen without actually touching the touchscreen will be referred to a "proximity touch" and an action of actually bringing the pointer into contact with the touchscreen will be referred to a "contact touch". In this case, a point at which the proximity touch occurs corresponds to a point of the touchscreen, in which the point is imaginarily projected during the proximity touch. The proximity sensor 141 senses the proximity touch and a proximity touch pattern (e.g., a proximity touch distance, a proximity touch direction, a proximity touch velocity, a proximity touch time, a proximity touch position, a proximity touch moving state, etc.). Information corresponding to the sensed proximity touch action and proximity touch pattern may then be displayed on the touchscreen.

The audio output module 152 may output audio data received from the wireless communication unit 110 or stored in the memory 160 in a call signal receiving mode, a telephone call mode, a recording mode, a voice recognition mode, or a broadcasting receiving mode. The audio output module 152 may output audio signals related to functions (e.g., a ringtone, a message tone, etc.) performed by the UE 100. The audio output module 152 may include a receiver, a speaker, a buzzer, etc.

The alarm unit 153 outputs a signal indicating generation of an event of the UE 100. For example, alarms may be generated upon receiving a call signal, receiving a message, inputting a key signal, inputting touch, etc. The alarm unit 153 may also output signals in forms different from video signals or audio signals, for example, a signal for indicating generation of an event may be generated through vibration. The video signals or the audio signals may also be output through the display unit 151 or the audio output module 152. Thus, the display unit 151 and the audio output module 152 may be classified as a type of the alarm unit 153.

The haptic module 154 generates various haptic effects that the user can feel. A representative example of the haptic effect generated by the haptic module 154 is vibration. An intensity and pattern of vibration generated by the haptic module 154 may also be controlled. For example, different vibrations may be combined and output or can be sequentially output.

The haptic module 154 may generate a variety of haptic effects including an effect of stimulus according to arrangement of pins vertically moving against a contact skin surface, an effect of stimulus according to a jet force or suction force of air through a jet hole or a sucking suction hole, an effect of stimulus of rubbing the skin, an effect of stimulus according to contact of an electrode, an effect of stimulus using an electrostatic force, and an effect according to a reproduction of cold and warmth using an element that can absorb or radiate heat as well as vibrations. The haptic module 154 may not only transmit haptic effects through direct contact but may also allow the user to feel haptic effects through a kinesthetic sense of the user's fingers or arms. The UE 100 may include two or more haptic modules 154 according to an embodiment type of the UE 100. The projector module 155 performs a function of projecting an image using the UE 100 and may display an image, which is the same as or partially different from an image displayed on the display unit 151, on an external screen or a wall according to a control signal of the controller 180.

In detail, the projector module 155 may include a light source (not shown) for generating light (e.g., a laser beam) for externally outputting an image, an image generator (not shown) for generating an image to be externally output using the light generated by the light source, and a lens (not shown) for enlarging and externally outputting an image from a predetermined focal distance. In addition, the projector module 155 may include a device (not shown) for mechanically moving the lens or the projection module 155 to adjust an image projection direction. The projector module 155 may be classified into a cathode ray tube (CRT) module, a liquid crystal display (LCD) module, a digital light processing (DLP) module, and so on according to a display device type. In particular, the DLP module uses a method of enlarging and projecting an image generated by reflecting the light generated by the light source by a digital micromirror device (DMD) chip, and may be advantageous in terms of miniaturization of the projector module 155. Preferably, the projector module 155 may be installed on a lateral surface, a front surface, or a rear surface of the UE 100 in a longitudinal direction thereof. Of course, the projector module 155 may be installed at any location of the UE 100 as necessary.

The memory 160 may store a program for processes and control of the controller 180 and may temporally store input/output data (e.g., phone book, messages, audio, still images, moving pictures, etc.). The memory 160 may also store frequency of use of each data (e.g., frequency of use of each telephone number, each message, and each multimedia). In addition, the memory 160 may store data about vibration and sounds in various patterns that are output when touch input is applied to the touchscreen.

The memory 160 may include at least one of storage media such as a flash memory, a hard disk type memory, a multimedia card micro type memory, a card type memory (e.g., an SD or XD memory), a random access memory (RAM), a static random access memory (SRAM), a read-only memory (ROM), an electrically erasable programmable read-only memory (EEPROM), a programmable read-only memory (PROM), magnetic memory, a magnetic disk, and an optical disk. The UE 100 may also operate in relation to a web storage that performs a storing function of the memory 160 on the Internet.

The interface unit 170 may serve as a path to external devices connected to the UE 100. The interface unit 170 may receive data from the external devices or power and transmit the data or power to internal components of the UE 100 or transmit data of the UE 100 to the external devices. For example, the interface unit 170 may include a wired/wireless headset port, an external charger port, a wired/wireless data port, a memory card port, a port for connecting a device having an identification module, an audio I/O port, a video I/O port, an earphone port, etc., for example.

The identification module is a chip that stores various information for authentication of an authority of the UE 100 and may include a user identify module (UIM), a subscriber identify module (SIM), a universal subscriber identity module (USIM), etc. A device (hereinafter, referred to as an 'identification device') including the identification module may be manufactured in the form of a smart card. Thus, the identification module may be connected to the UE 100 through a port. The interface unit 170 may also be a path through which power from an external cradle is supplied to the UE 100 when the UE 100 is connected to the external cradle or a path through which various command signals input by the user through the cradle are transmitted to the UE 100. The various command signals or power input from the cradle may be used as signals for confirming whether the UE 100 is accurately set in the cradle. The controller 180 may control overall operations of the UE 100. For example, the controller 180 may perform control and processing for voice communication, data communication, video telephony, etc. The controller 180 may include a multimedia module 181 for reproduction of multimedia. The multimedia module 181 may be internally embodied in the controller 180 or separately embodied from the controller 180.

The controller 180 may perform a pattern recognition process via which handwriting input or picture-drawing input applied to the touch screen is recognized as characters or images.

The power supply unit 190 may receive external power and internal power and supply power required for operations of the components according to control of the controller 180.

Prior to the description of embodiments of the present invention, several positioning methods are now described. First, WiFi Positioning System (WPS) (fingerprinting) is described as a positioning method. The fingerprinting is a method based on empirical data, in which an area which is subjected to positioning is divided into regions in the cell form or various forms, values of signals transmitted from an access point (AP) are measured at each reference point of the regions, and the values are stored in the form of database. After the database of received signals is established, a signal value measured via actual positioning and a value stored in the database are compared to determine a location.

That is, the fingerprinting may broadly include two steps. In a first step, an area which is subjected to location estimation is divided into regions in the specific form, intensity of a signal of the AP at each reference point of the regions, and collects data based on the signal intensity. In a second step, an actual location is estimated using a specific algorithm based on data stored in the form of database and signal values transmitted from the AP, measured in reality.

Figure 2:
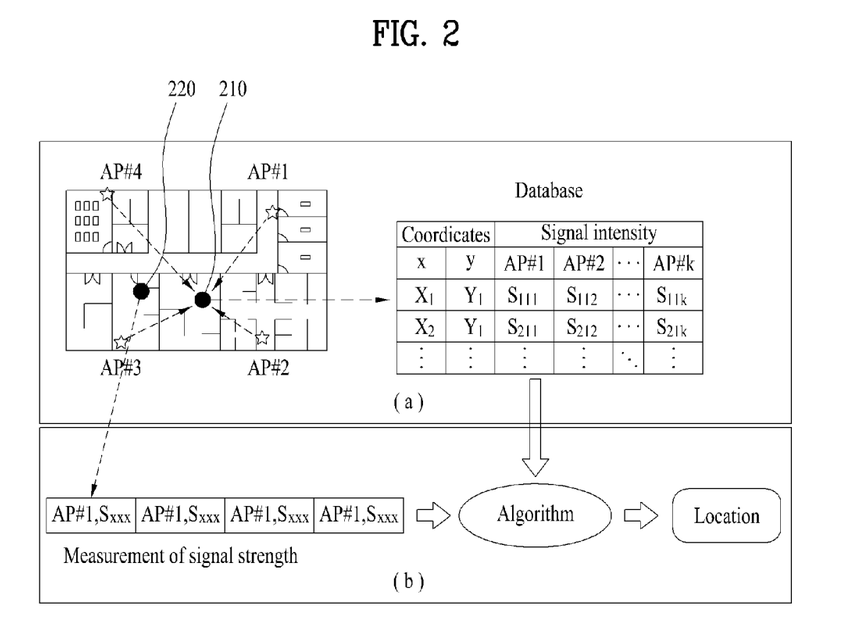
FIG. 2 is a diagram of a positioning method of fingerprinting by a WiFi positioning system (WPS)

FIG. 2 is a diagram of a positioning method of fingerprinting by a WPS.

FIG. 2(A) is a diagram for explanation of a step of collecting a signal for location estimation, in which a UE measures values of signals received from a plurality of APs AP1, AP2, AP3, and AP4 at a specific reference point 210 and establishes database. FIG. 2(B) illustrates a step of estimating a current location by applying intensity of signals measured at a measurement point 220 and intensity of signals stored in the database to an algorithm to estimate a current location. The WPS using fingerprinting does not require time synchronization for location estimation, and multipath components according to environment are contained in database. Thus, the WPS system is advantageous to accurately estimate a location indoors. However, the WPS is disadvantageous in that database needs to be established for service areas and to be updated according to change in internal environment (e.g., AP movement, etc.). Next, an inertial positioning method as another positioning method will be described in brief.

Figure 3:
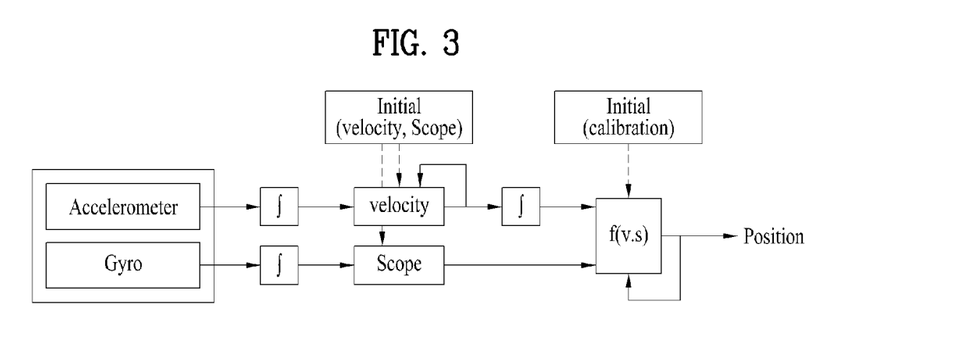
FIG. 3 is a diagram for explanation of positioning via an accelerometer and a gyroscope.

FIG. 3 is a diagram for explanation of positioning via an accelerometer and a gyroscope.

Referring to FIG. 3, an inertial sensor may include an accelerometer (an acceleration sensor) and a gyroscope (an angular velocity sensor). In general, the present method is a method of calculating a relative location value by measuring a movement distance at a reference point using an accelerometer and by measuring a movement direction using a gyroscope. According to the positioning using the inertial sensor, the current location is estimated based on the values calculated by the accelerometer and the value calculated by the gyroscope using an algorithm.

Location estimation using the inertial sensor is performed using the following method. First, the movement distance may be recognized by performing integration on a value measured by the accelerometer and the movement direction may be recognized by performing integration on a value measured by the gyroscope. Since the movement distance and the movement direction are recognized using the inertial sensor, a movement point on coordinates may be recognized, thus achieving positioning. The inertial sensor based positioning calculates a relative movement value with respect to a reference point, and thus, various errors may be experienced. For example, errors due to the precision of the reference point, errors of the inertial sensor itself (e.g., a temperature or bias), and errors due to movement (e.g., a behavior pattern, a movement pattern, and a rotation pattern) may be experienced in the inertial sensor based positioning.

To overcome problems of the conventional positioning method, the present invention proposes a method of accurately calculating a location of a user or UE indoors using location information obtained via inertial sensor measurement and a wireless LAN (e.g., WiFi) as a method of estimating a location of the user or UE indoors.

A GPS that is extensively used for positioning receives a signal transmitted from three or more GPS satellites to calculate a location. Thus, it is difficult to estimate the location using the GPS in an indoor area where it is difficult to receive a GPS signal. Due to such disadvantages of the GPS, a location is estimated using an infra-based WPS for positioning indoors. However, an error range is about 3 m, and thus, it is difficult to obtain accurate location information indoors. Thus, the present invention proposes a hybrid positioning method for improvement of accuracy of indoor positioning using an inertial sensor and a WPS and positioning tracking of a current location of a UE. The hybrid location estimation used to estimate a location of a user or UE indoors may be started according to an autonomous operation and UE starting as follows.

1. Autonomous Operation

When a UE that is receiving location information using a GPS cannot receive a GPS signal or reception of GPS signals is blocked indoors, the UE begins a hybrid positioning (HP) operation of measuring a current location using sensors built in the UE or estimating the current location using other wireless systems such as a WiFi AP, etc. That is, the UE checks whether intensity of the received GPS signal satisfies a threshold value. When the intensity does not satisfy the threshold value, the UE stops the measurement via the GPS and begins the HP. Here, the threshold value of intensity of the received GPS signal may be already contained in the UE or obtained through information received from a BS.

When it is confirmed that a user/UE is located indoors through a WPS during the positioning, the UE may begin the HP. For example, the UE may access an AP and receive location information from the AP to determine whether the UE is located indoors for positioning. In this case, whether the UE is located indoors may be determined by simply accessing the AP or may be determined based on location information received from the AP.

2. User Starting

A user may begin HP for positioning in a building, that is, indoors. For example, the user may start a HP operation using HP by driving an AP or a positioning system indoors. That is, a UE may begin the HP operation via a user's input for positioning.

Accordingly, the HP operation of the UE may be started by autonomous operation or user starting according to a situation. The HP started for accurate positioning indoors may be performed using various methods according to a method of using an inertial sensor or an infra-based signal (for example, Wi-Fi, ZigBee, and Bluetooth). A HP method performed by the UE by the above starting will be described in detail.

Embodiment 1

HP Method Using Location Information of Periodic WPS Based on Inertial Sensor

Figure 4:
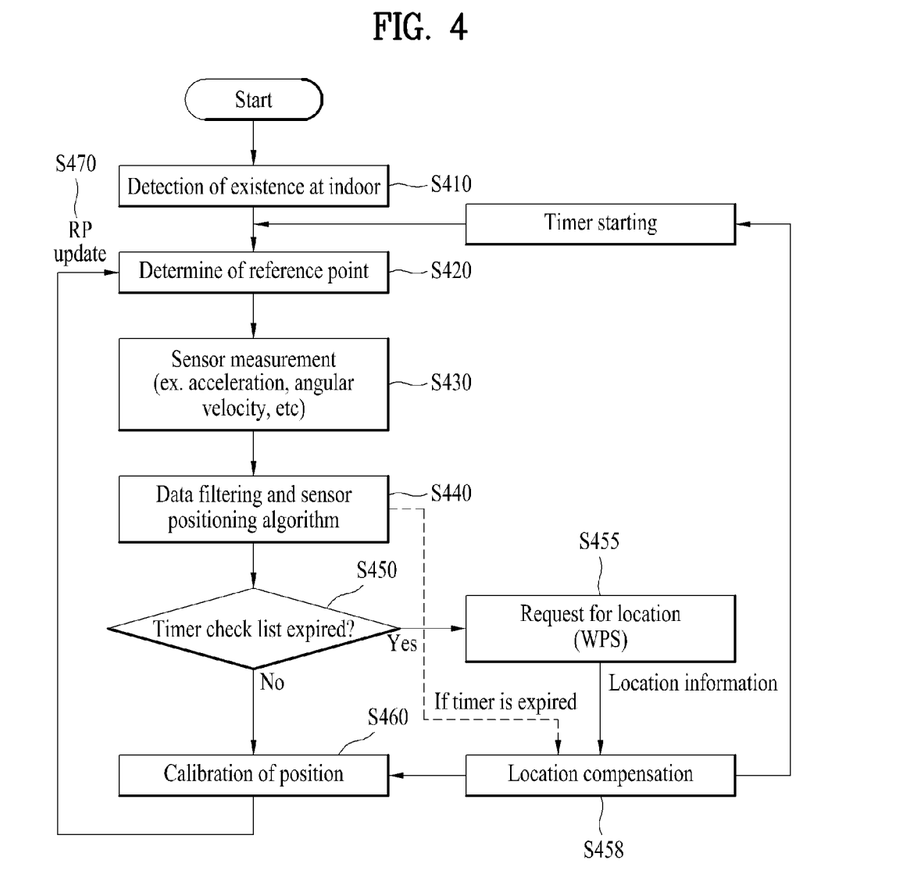
FIG. 4 is a flowchart for explanation of a hybrid positing (HP) method according to Embodiment 1 of the present invention.

FIG. 4 is a flowchart for explanation of a HP method according to Embodiment 1 of the present invention.

As described above, the UE starts the HP operation indoors for indoor positioning. To this end, the UE checks whether it is located indoors (S410). In general, the UE acquires location information outdoors using a GPS method. However, the GPS method may not be appropriate due to much measurement errors. Thus, when the UE cannot receive a GPS signal while performing positioning outdoors using the GPS method, when reception of GPS signals is blocked, or when intensity of received GPS signals is less than a threshold value, the UE may recognize that the UE is located indoors. Then, the UE starts a HP operation of measuring a current location using sensors built therein or estimating the current location using other wireless systems such as a WiFi AP, etc.

The UE that starts the HP operation receives information regarding an indoor location from an AP using an infra-based signal (e.g., Wi-Fi (WLAN)) or a wireless communication scheme (e.g., Bluetooth, ZigBee, etc.) corresponding to the infra-based signal via which positioning indoors can be achieved, and sets a location where the reception is performed to a positioning start point (or a reference point) (S420). Hereinafter, it is assumed that the term 'WiFi' refers to any wireless communication scheme via which positioning indoors can be achieved, such as WiFi. In order to set a start point (SP)/release point (RP) in the indoor HP of the UE, initial time for initial location estimation is set for location estimation. Then, during corresponding time, the UE may access an AP and receive infra-based location information using an infra-based signal (for example, Wi-Fi, zigbee and Bluetooth signals).

When the UE acquires location information via communication with the AP, the UE may store acquired location information as an initial location and then measure acceleration, angular velocity, intensity of magnetic field, etc. using an inertial sensor (S430).

On the other hand, the UE may determine the SP/RP using intensity of a GPS signal (S420). That is, when the UE estimates a location outdoors using a GPS and then moves indoors, if intensity of the received GPS signal does not satisfy a threshold value (for example, received signal strength (RSS)<threshold value), a last location transmitted using the GPS is set to an initial position to complete the measurement using the inertial sensor. (S430). Measurement and positioning calculation using the inertial sensor may be performed follows.

Measurement Using the Inertial Sensor and Positioning Calculation 1

The UE may perform measurement using the inertial sensor (for example, an accelerometer or a gyroscope) to measure a movement direction, acceleration, and angular velocity for specific time duration (S430). The acceleration and angular velocity measured using the inertial sensor are calculated as positioning information through the following processes.

The acceleration sensor may set speed that is not 0 due to influence of temperature, noise, bias, etc. even if there is no movement. Thus, an operation is required to correct these errors. To this end, the UE performs filtering using a discrimination window (or a threshold value) in order to determine whether the measured value is valid data (S440). Information regarding filtering of the measured data and the discrimination window may be stored in the UE in advance or transmitted to the UE from an AP or a BS.

After the filtering of the data is completed (that is, when the data measured by the acceleration sensor is valid), the UE identifies a movement type via second filtering of the filtered data. For example, the movement is identified (whether the movement is dynamic or static) based on the filtered data using a highpass filter and a lowpass filter (S440).

The UE that determines whether the movement is dynamic or static applies dual integration to the filtered data to calculate information regarding a distance (S440). In this case, when the integration is performed, area errors occur due to sampling limitation during a quantization process, and thus, errors occur during distance estimation. In order to reduce errors of integration, errors may be reduced using an integration error algorithm (e.g., a trapezoidal method, Simpson ⅓ method, etc.) during the dual integration. The UE calculates the information regarding the distance based on the measured acceleration using the algorithm for reducing integration errors, as described above (S440). In addition, a movement type (e.g., running, working, or jogging) of the UE may be identified using the filtered data or the velocities obtained by filtering and integrating the measured acceleration data.

Errors of the calculated distance information may be reduced using length and time information according to the obtained movement type. For example, the UE may calculate final distance information by applying weight factors w1 and w2 to distance information d2 obtained based on the length and time according to the movement type and distance information d1 estimated via integration (S440). That is, when weight factors calculated in consideration of the reliability of the measured distances d1 and d2 are w1 and w2, the calculated movement distance may be represented according to the sum of multiplication of the weight factors of the measured distances. In addition, the movement distance may be calculated using calculated difference in distance and a weight factor offset value. The weight factor may be a fixed value or a value calculated in consideration of the reliability of sensor information obtained via measurement. The current location of the UE may be finally recognized by applying a movement direction calculated from the measured angular velocity to the movement distance calculated in consideration of the weight factors based on reliability.

Measurement Using the Inertial Sensor and Positioning Calculation 2

The UE may calculate information regarding a movement direction using information obtained via measurement using an inertial sensor, that is, an acceleration sensor and an angular sensor (S440). Integration may be applied using measurement time and velocity and angular velocity may be calculated for predetermined duration. First, the UE may calculate movement velocity and distance with respect to axes (x, y, z) using an acceleration value measured via the acceleration sensor. In this case, the UE may acquire information regarding the movement direction of the UE and information of vertical movement on a two-dimensional (2D) space (plane) using information regarding x-axis and y-axis. In addition, location information regarding the movement direction may be calculated using the angular velocity measured by the angular velocity sensor. The UE may calculate the movement direction information and the vertical movement information using the values measured by the acceleration sensor and the angular velocity sensor. The information regarding the movement direction may be calculated based on the values measured by the acceleration sensor and the angular velocity sensor using various methods.

The UE that acquires positioning information (the movement distance and movement direction) acquired via the inertial sensor measurement and calculation checks a timer to determine whether WPS information is determined (S450). When the timer is not expired, that is, when current time is within a period for reception of the WPS information, (S450), the UE may calibrate and display a location of the UE using the positioning information acquired by the inertial sensor (S460). The UE updates the reference point/start point for measurement of the inertial sensor using the acquired location information (S470). After the update is completed, until the timer is expired, that is, until the location information is received by the WPS, the above processes are repeated to acquire information of a location of the UE.

As another method, when the UE recognizes that the timer is expired, or the period for reception of the location information by the WPS is reached (S450), the UE performs the following operation for positioning. In order to estimate location information by the WPS, the UE measures RSS from APs. In addition, the UE informs an AP about the measured RSS. Then, the AP generates the location information based on the corresponding information and transmits the location information to the UE (S455). Then, the UE may compensate for a location based on the location information received from the AP and calibrate and display the location of the UE (S458 and S460). Then, the UE may update the location using the acquired location information of the UE (S470).

The update of the reference point during the positing may be performed as follows.

The UE updates the reference point using the location information received through the WPS (S470). Alternatively, the UE updates the reference point using both WPS information received by the UE and the location information that is measured by the inertial sensor for corresponding duration (S470). For example, weight factors (e.g., offset values) obtained in consideration of the reliability of the location information may be applied to the location information obtained via the WPS and the location information obtained via the sensor to calculate and use location information to be updated. The reference point may also be updated using information regarding geographical features or route of a place where the UE is currently located. In addition, when it is determined that the UE is being moved from one region to another region, a location of the UE at an intermediate location may be updated to a location on a path connecting the two regions.

Through the aforementioned process, the UE performs a HP operation using the WPS and inertial sensor and construction information of the current location. In addition, a region of the HP operation may be broadly divided into three regions (an initial region, a measurement region, and an update region). In this regard, operations of the UE for HP will now be described below.

HP Operation in Initial Region

In order to set an initial reference point for performing HP, the UE accesses an AP and receives indoor location information from the accessed AP to set the initial reference point. In general, the HP in the initial region is present in only an initial period.

HP Operation in Measurement Region

The UE performs measurement using the inertial sensor and calculates positioning information (movement distance and movement direction) of the UE using the measured data.

HP Operation in Update Region

The UE checks a time and a period to perform the following operations. When the timer is expired or the WPS period is reached, the UE transmits a signal to the AP and receives location information from the AP. In this case, calculate location information is updated using only the received location information or both received location information and location information calculated via measurement. When current time is within a period or a timer is not expired, the UE updates positioning information using location information calculated using a sensor. Even if the current time is within the period, when the UE determines that the location information updated by the sensor or the like is abnormal (for example, abnormal acceleration, etc.), the UE may transmit a signal for update of the location information from the AP, receive location information, and update the received location information.

Embodiment 2

HP Method Simultaneously Using WPS Information and Sensor Information

Figure 5:
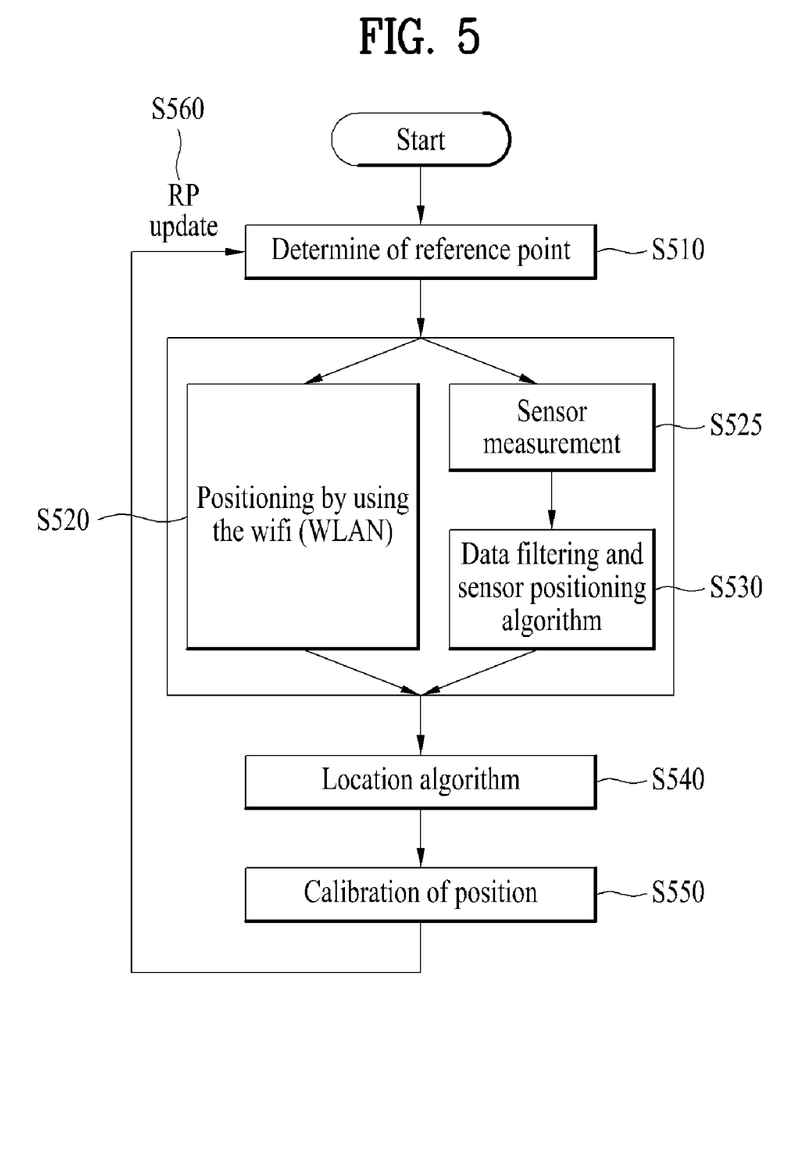
FIG. 5 is a flowchart method of for explanation of a HP method according to Embodiment 2 of the present invention.

FIG. 5 is a flowchart method of for explanation of a HP method according to Embodiment 2 of the present invention.

Referring to FIG. 5, unlike in the method according to Embodiment 1 in which WPS information is received every predetermined period and positioning is performed via a sensor in a period, a UE always calculates location information of the UE using WPS information and information acquired based on sensor measurement information in order to positioning information. That is, the UE may acquire the WPS location information by transmitting and receiving signals to and from an AP in order to obtain location information. In this case, the UE may acquire data (acceleration, angular velocity, etc.) via measurement of an inertial sensor. The UE that obtains data regarding a location using the WPS and the inertial sensor may recognize the location using the information. Processes of positioning simultaneously using the WPS location information and the inertial sensor location information will be described below.

When the HP operation according to Embodiment 2 is started, first, the UE sets a reference point (S510). The reference point is set by setting only the WPS location information received from the AP when the HP operation is initially performed or setting, as the reference point, location information calculated using the inertial sensor measurement information and WPS information received during set training time.

After the reference point is set, the UE performs two steps for positioning. That is, the UE may receive location information from the AP using the WPS (S520), measure positioning via the inertial sensor (S525), filter measured data, and perform a positioning algorithm for identification of movement (whether the movement is static or dynamic) based on the filtered data using a highpass filter and a lowpass filter (S530). The UE applies the positioning algorithm based on the data obtained in steps S520, S525, and S530 to recognize a movement distance and a movement direction (S540). In this case, step S520 and steps S525 to S530 may be performed in parallel or sequentially performed in series. When the steps are performed in series, the UE may calculate location information by performing a plurality of measurement operations by the inertial sensor while the UE receives location information through an AP.

The UE may apply location information transmitted through the WPS and location information recognized through the inertial sensor to a location estimation algorithm to obtain location information of the UE (S540), calibrate and display the location information (S550), and update a reference point to the calibrated location (S560). In Embodiment 2, the UE may estimate a location using the same location estimation algorithm as in Embodiment 1 or various algorithms.

Embodiment 3

Figure 6:
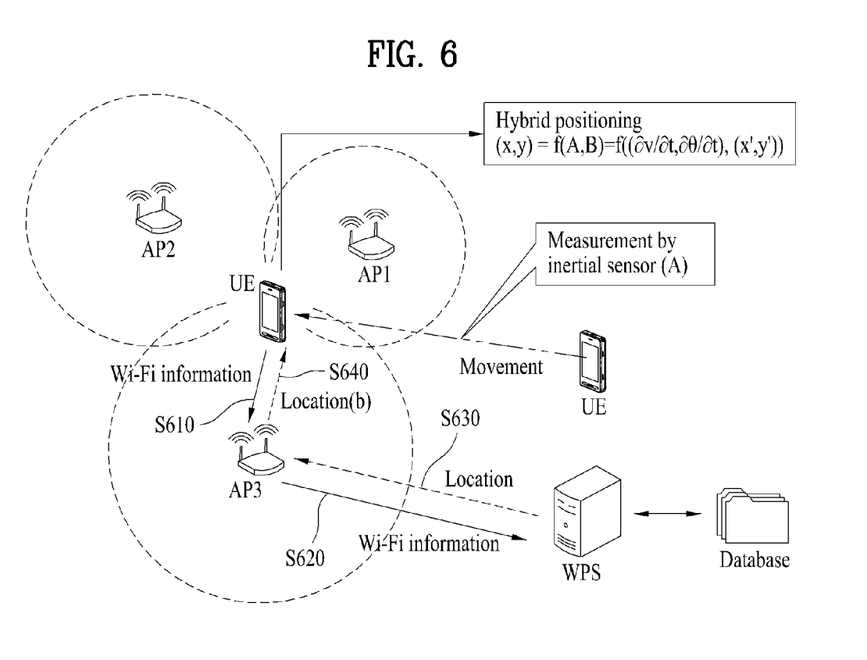
FIG. 6 is a diagram for explanation of a HP method of transmitting sensor measurement information to an infra to estimate a location, according to Embodiment 3 of the present invention.

HP Method of Transmitting Sensor Measurement Information to an Infra to Estimate Location FIG. 6 is a diagram for explanation of a HP method of transmitting sensor measurement information to an infra to estimate a location, according to Embodiment 3 of the present invention.

Unlike in the method according to Embodiments 1 and 2 in which the UE estimates a location of the UE using location information received from the WPS directly by the UE and location information obtained using an inertial sensor for a HP operation, Embodiment 3 of the present invention relates to a method in which the UE transmits information required for positioning to an infra, and the infra estimates (or calculates) a location of the UE based on the transmitted data and transmits estimated location information to the UE.

The UE performing the HP operation transmits intensity of signals received from APs to the APs for positioning (S610). In this case, when the UE transmits received signal intensity information regarding the signals received from the APs to the APs, the UE may also transmit data measured via an inertial sensor to the AP. Then, sensor information transmitted to the AP from the UE may be configured by all or a portion of the following information.

Acceleration, axis acceleration
Angular acceleration
Measurement time information)
Sensor reliability)
or variation in the aforementioned parameters for predetermined time
(period)

A period P2 at which the UE reports received signal intensity of APs may be equal to a report period of sensor information by the UE or represented by integer multiple. In addition, even if the period is equal to the report period, reported sensor information may include a combination of data measured during a corresponding period, instead of single information regarding the period. The UE may transmit data measured by a sensor to an AP through a data channel. In this case, the UE may request the AP to transmit the measured data through the data channel, through a control channel. The AP that receives sensor measurement information and location information for the WPS transmits the information to a location server or an infra (S620). When the location server or the infra calculates positioning information regarding the UE and re-transmits the positioning information to the AP (S630), the AP may re-transmit the positioning information to the UE (S640), and thus, the UE may recognize the location of the UE.

As it is apparent from the above embodiments, the UE may acquire accurate positioning information indoors using a HP operation using location information by a WPS and location information obtained via calculation and measurement of an inertial sensor.

According to the above embodiments of the present invention, the UE may acquire accurate positioning information indoors using a HP operation using location information by a WPS and location information obtained via calculation and measurement of an inertial sensor.

The embodiments of the present invention described above are combinations of elements and features of the present invention. The elements or features may be considered selective unless otherwise mentioned. Each element or feature may be practiced without being combined with other elements or features. Further, an embodiment of the present invention may be constructed by combining parts of the elements and/or features. Operation orders described in embodiments of the present invention may be rearranged. Some constructions of any one embodiment may be included in another embodiment and may be replaced with corresponding constructions of another embodiment. It is obvious to those skilled in the art that claims that are not explicitly cited in each other in the appended claims may be located in combination as an embodiment of the present invention or included as a new claim by a subsequent amendment after the application is filed.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A positioning method of estimating a location of a user equipment (UE) in a wireless network, the method comprising:
    determining whether the UE is located indoors based on a received signal intensity of a global positioning system (GPS) signal used by the UE to perform a GPS-based positioning method; and
    when the UE determines that the UE is located indoors:
        changing a positioning method of the UE from the GPS-based positioning method to a positioning method that uses a local area network (LAN)-based signal;
        setting a reference point for calculating a location of the UE; and
        calculating the location of the UE based on the reference point and the LAN-based signal, wherein the calculating comprises:
            calculating a first movement distance of the UE based on a movement distance and a movement time according to a movement type of the UE relative to the reference point;
            calculating a second movement distance using measured acceleration information;
            calculating a final movement distance of the UE relative to the reference point by applying a first movement distance weight factor to the first movement distance and a second movement distance weight factor to the second movement distance; and
            calculating the location of the UE based on the final movement distance and a movement direction obtained from measured angular velocity.

2. The positioning method according to claim 1, wherein calculating the first movement distance of the UE comprises:
    determining whether the measured acceleration information is valid data; and
    if it is determined that the measured acceleration information is valid data,
        identify the movement type of the UE by filtering the valid data; and
        calculating the movement distance and the movement time according to the movement type of the UE.

3. The positioning method according to claim 1, wherein calculating the second movement distance comprises calculating the second movement distance by performing dual integration on the measured acceleration information.

4. The positioning method according to claim 1, wherein the first movement distance weight factor and the second movement distance weight factor are determined in consideration of the reliability of sensor information obtained from measurement.

5. The positioning method according to claim 1, further comprising:
    updating the reference point to a point corresponding to the calculated location of the UE.

6. A user equipment (UE) for estimating a location in a wireless network, the UE comprising;
    a location information module; and
    a processor configured to control the location information module to:
        determine whether the UE is located indoors based on a received signal intensity of a global positioning system (GPS) signal used by the UE to perform a GPS-based positioning method, and
        when the location information module determines that the UE is located indoors:
            change a positioning method of the UE from the GPS-based positioning method to a positioning method using a local area network (LAN)-based signal,
            set a reference point for calculating a location of the UE, and
            calculate the location of the UE based on the reference point and the LAN-based signal,
    wherein the processor is further configured to control the location information module to:
        calculate a first movement distance of the UE based on a movement distance and a movement time according to a movement type of the UE relative to the reference point;
        calculate a second movement distance using measured acceleration information;
        calculate a final movement distance of the UE relative to the reference point by applying a first movement distance weight factor to the first movement distance and a second movement distance weight factor to the second movement distance; and
        calculate the location of the UE based on the final movement distance and a movement direction obtained from measured angular velocity.

7. The UE according to claim 6, wherein the location information module for calculating the first movement distance of the UE is further configured to
    determine whether the measured acceleration information is valid data, and
    if it is determined that the measured acceleration information is valid data, identify the movement type of the UE by filtering the valid data, calculate the movement distance and the movement time according to the movement type of the UE.

8. The UE according to claim 7, wherein the location information module is further configured to calculate the second movement distance comprises calculating the second movement distance by performing dual integration on the measured acceleration information.

9. The UE according to claim 8, wherein the first movement distance weight factor and the second movement distance weight factor are determined in consideration of the reliability of sensor information obtained from measurement.

10. The UE according to claim 6, wherein the location information module is configured to update the reference point to a point corresponding to the calculated location of the UE.

* * * * *